US012695605B2

(12) United States Patent
Celozzi et al.

(10) Patent No.: US 12,695,605 B2
(45) Date of Patent: Jul. 28, 2026

(54) METHOD AND APPARATUS FOR A SOFTWARE DEFINED NETWORK

(71) Applicant: Telefonaktiebolaget LM Ericsson (PUBL), Stockholm (SE)

(72) Inventors: Giuseppe Celozzi, Naples (IT); Pietro Picaro, Formia (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 183 days.

(21) Appl. No.: 18/547,298

(22) PCT Filed: Feb. 23, 2021

(86) PCT No.: PCT/EP2021/054440
§ 371 (c)(1),
(2) Date: Aug. 21, 2023

(87) PCT Pub. No.: WO2022/179677
PCT Pub. Date: Sep. 1, 2022

(65) Prior Publication Data
US 2024/0146518 A1    May 2, 2024

(51) Int. Cl.
*H04L 9/08*          (2006.01)
(52) U.S. Cl.
CPC .......... *H04L 9/0852* (2013.01); *H04L 9/0819* (2013.01); *H04L 9/085* (2013.01)
(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14;

H04L 9/0827; H04L 2209/24; H04L 9/08; H04L 9/0819; H04L 9/088; H04L 9/0869; H04W 12/041; H04W 12/0431;
(Continued)

(56) References Cited

U.S. PATENT DOCUMENTS 5,764,765 A * 6/1998 Phoenix ................ H04L 9/0858
                                                        380/256
6,748,083 B2 * 6/2004 Hughes ................. H04L 9/0858
                                                        380/278
(Continued)

FOREIGN PATENT DOCUMENTS

CN          110661620 A        1/2020

OTHER PUBLICATIONS

Alejandro Aguado et al., "The Engineering of Software-Defined Quantum Key Distribution Networks", Future Internet: Architectures and Protocols, IEEE Communications Magazine, Jul. 2019.
(Continued)

*Primary Examiner* — Sharif E Ullah
(74) *Attorney, Agent, or Firm* — Baker Botts L.L.P.

(57)          ABSTRACT
A method (100) performed by an apparatus in a Software Defined Network, SDN, the method comprising: receiving (102) a request to define a virtual link, VL, in the SDN, the request including security constraint information for the VL; identifying (104) from a network topology of the SDN physical links that are Quantum Cryptography, QC, enabled; computing (106) a path for the VL using only physical links of the identified QC enabled physical links; and initiating (108) provisioning of the VL using the computed path.

15 Claims, 8 Drawing Sheets

(58) Field of Classification Search
CPC . H04W 12/0433; H04W 12/04; H04W 12/61; H04W 12/63; H04W 12/71; G06F 21/31; G06F 21/44; G06F 7/588; G06F 21/72; G06F 21/86
USPC ........ 380/278, 255, 264, 276; 726/2, 21, 36; 713/150, 163, 181
See application file for complete search history.

(56) References Cited

U.S. PATENT DOCUMENTS

| | | | | |
|---|---|---|---|---|
| 7,437,081 | B2 * | 10/2008 | Mitchell | H04B 10/70 398/154 |
| 8,855,316 | B2 * | 10/2014 | Wiseman | H04L 9/0855 380/278 |
| 9,960,465 | B2 * | 5/2018 | Dudley | H01M 50/204 |
| 10,057,058 | B2 * | 8/2018 | Murakami | H04L 9/0858 |
| 11,469,888 | B2 * | 10/2022 | McCandlish | H04L 9/0858 |
| 12,028,450 | B2 * | 7/2024 | Su | H04L 9/08 |
| 12,124,364 | B2 * | 10/2024 | Tajima | G06F 11/3692 |
| 2005/0138352 | A1 * | 6/2005 | Gauvreau | H04L 9/3247 713/153 |
| 2005/0221759 | A1 * | 10/2005 | Spadafora | G08G 1/093 455/39 |
| 2007/0065154 | A1 * | 3/2007 | Luo | H04L 9/0852 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2011/0206204 | A1 * | 8/2011 | Sychev | H04J 14/06 380/256 |
| 2011/0213979 | A1 * | 9/2011 | Wiseman | H04L 9/0844 713/171 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0133652 | A1 * | 5/2014 | Oshida | H04L 9/0897 380/255 |
| 2016/0155327 | A1 * | 6/2016 | Schlienz | G08G 1/096791 340/907 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2017/0338952 | A1 * | 11/2017 | Hong | H04L 9/083 |
| 2018/0176091 | A1 * | 6/2018 | Yoon | H04L 5/1446 |
| 2019/0036821 | A1 * | 1/2019 | Levy | G06F 12/0868 |
| 2019/0260581 | A1 * | 8/2019 | Su | H04L 9/08 |
| 2019/0349392 | A1 * | 11/2019 | Wetterwald | H04L 43/0852 |
| 2020/0084222 | A1 * | 3/2020 | William | H04L 63/12 |
| 2020/0351087 | A1 * | 11/2020 | Mccandlish | H04L 9/0897 |
| 2022/0360434 | A1 * | 11/2022 | Choi | H04L 63/061 |
| 2024/0146518 | A1 * | 5/2024 | Celozzi | H04L 9/085 |
| 2025/0007700 | A1 * | 1/2025 | Zhang | H04L 9/0852 |

OTHER PUBLICATIONS

ETSI GR QKD 003 V2.1.1 (2018-03); Quantum Key Distribution (QKD); Components and Internal Interfaces.
ETSI GR QKD 007 V1.1.1 (2018-12); Quantum Key Distribution (QKD); Vocabulary.
ETSI GS NFV-IFA 014 V3.3.1 (Sep. 2019); Network Functions Virtualisation (NFV) Release 3; Management and Orchestration; Network Service Templates Specification.
ETSI GS QKD 002 V1.1.1 (Jun. 2010); Quantum Key Distribution; Use Cases.
ETSI TS 133 107 V16.0.0 (Aug. 2020); Universal Mobile Telecommunications System (UMTS); LTE; Digital cellular telecommunications system (Phase 2+) (GSM); 3G security; Lawful interception architecture and functions (3GPP TS 33.107 version 16.0.0 Release 16).
ETSI; ETSI White Paper No. 27; Implementation Security of Quantum Cryptography Introduction, challenges, solutions; First edition—Jul. 2018.
ITU-T, Y.3800; Telecommunication Standardization Sector of ITU (Oct. 2019); Series Y: Global Information Infrastructure, Internet Protocol Aspects, Next-Generation Networks, Internet of Things and Smart Cities; Cloud Computing; Overview on networks supporting quantum key distribution.
E. Haleplidis, Ed et al., "Software-Defined Networking (SDN): Layers and Architecture Terminology" Internet Research Task Force (IRTF), Request for Comments: 7426, Jan. 2015.
SDN Architecture, SDN architecture, Issue 1, Jun. 2014, ONF TR-502, Open Networking Foundation.
Rui Wang et al., "End-to-End Quantum Secured Inter-Domain 5G Service Orchestration Over Dynamically Switched Flex-Grid Optical Networks Enabled by a q-ROADM" Journal of Lightwave Technology, vol. 38, No. 1—Jan. 1, 2020.
PCT Notification of Transmittal of the International Search Report and the Written Opinion of the International Searching Authority, or the Declaration issued for International application No. PCT/EP2021/054440—Nov. 9, 2021.
PCT International Preliminary Report On Patentability issued for International application No. PCT/EP2021/054440—Jan. 27, 2023.

* cited by examiner

100

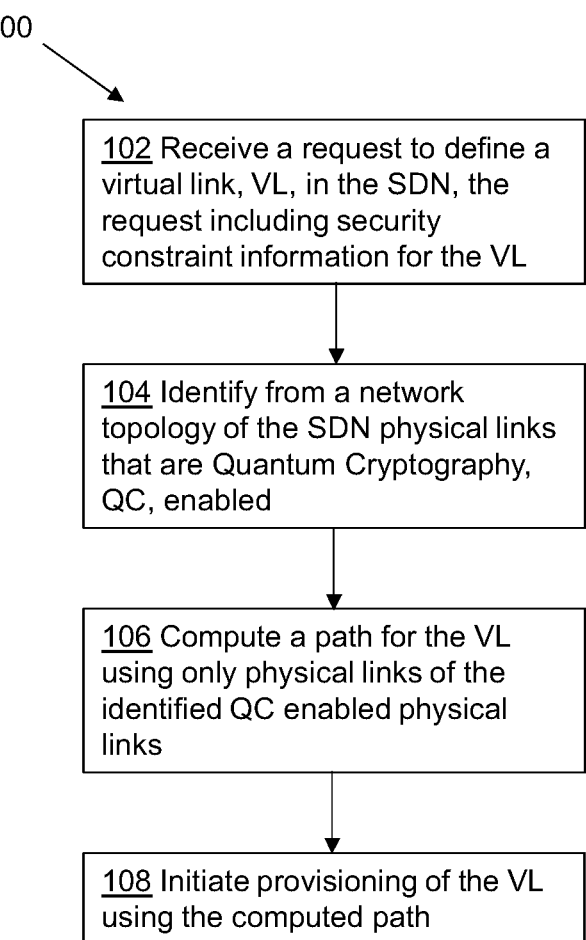

102 Receive a request to define a virtual link, VL, in the SDN, the request including security constraint information for the VL 104 Identify from a network topology of the SDN physical links that are Quantum Cryptography, QC, enabled 106 Compute a path for the VL using only physical links of the identified QC enabled physical links 108 Initiate provisioning of the VL using the computed path

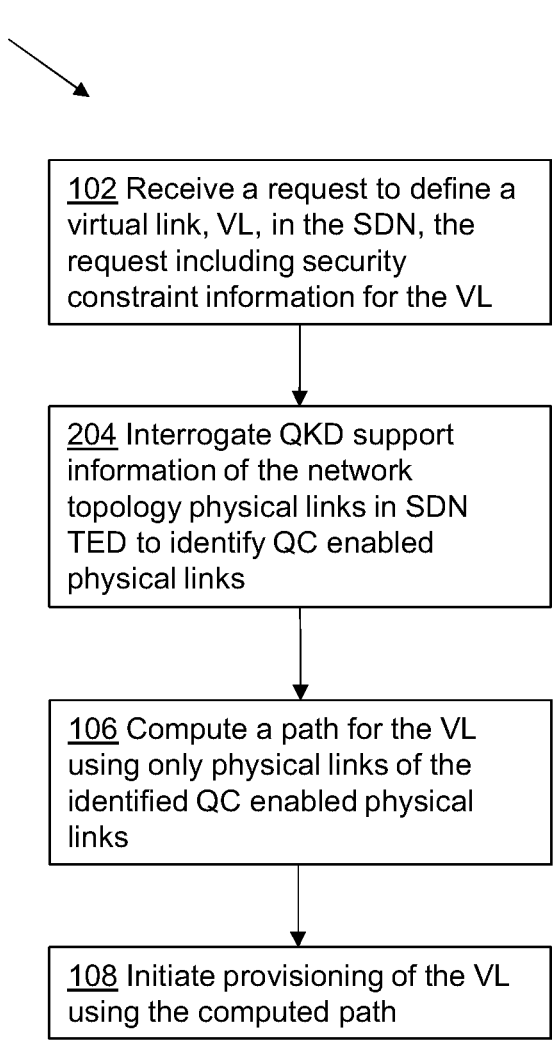

102 Receive a request to define a virtual link, VL, in the SDN, the request including security constraint information for the VL 204 Interrogate QKD support information of the network topology physical links in SDN TED to identify QC enabled physical links 106 Compute a path for the VL using only physical links of the identified QC enabled physical links 108 Initiate provisioning of the VL using the computed path

METHOD AND APPARATUS FOR A SOFTWARE DEFINED NETWORK

PRIORITY

This nonprovisional application is a U.S. National Stage Filing under 35 U.S.C. § 371 of International Patent Application Serial No. PCT/EP2021/054440 filed Feb. 23, 2021 and entitled "METHOD AND APPARATUS FOR A SOFTWARE DEFINED NETWORK," which is hereby incorporated by reference in its entirety.

TECHNICAL FIELD

The invention relates to a method performed by an apparatus in a Software Defined Network, SDN, to an apparatus for an SDN and to an apparatus for defining a virtual link in an SDN.

BACKGROUND

Software Defined Networking refers to an approach for network programmability in which network control and data forwarding functions are separated, with control functions centralised in one or more software implemented SDN controllers. Software Defined Networking affords the capacity to initialize, control, change, and manage network behaviour dynamically via open interfaces. The centralised network Control Layer of SDN architectures allows for flexible and efficient network management, and also, through dynamic and automated programming, facilitates the optimisation of network resources. The separation of control and data functions allows for faster innovation cycles in both Control and Data layers.

FIGS. 1 and 3 illustrate example SDN architectures in which core functions of the network are concentrated in SDN controllers in the Control Layer. Service providers communicate network requirements and required network behaviour to SDN controllers via Applications in the Application Layer. These requirements, received over standardised interfaces between the Application and Control Layers, are translated by the SDN controllers and enforced via standardised interfaces between the SDN controllers in the Control Layer and the individual Network Elements (NEs) in the Infrastructure Layer. Service providers thus gain network control independence from network equipment vendors, and can initialise network nodes through simple programming, as opposed to manually configuring individual elements. The centralised functions of the SDN controller can also be used to promptly handle network issues and greatly reduce the time needed to provide a new network service or application.

As illustrated in FIG. 2, SDN architectures provide Application Programming Interfaces (APIs), enabling users to implement customised services for certain purposes including switching, routing, network resource allocation, bandwidth management, traffic engineering, system optimization, Quality of Service, QoS, security, access control lists, ACLs, and policy management.

Within individual SDN controllers, Traffic Engineering, TE, information is exchanged, allowing for the population of a Traffic Engineering Database, TED. The TED contains resource attribute information and network topology information for the domain or domains in the network under the authority of the SDN controller. Resource attributes may include bandwidth, delay, jitter performance and metrics (for example, cost) associated with resources in the network. The network topology information may include node and link identity as well as node/link connectivity. The SDN controller may then request computation of a path by a Path Computation Element, PCE. The PCE computes an optimal path based on source and destination node information and performance requirements received from the SDN controller, and on resource attribute and connectivity information received from the TED, including network link parameters and attributes.

Data transported over an SDN may have varying levels of sensitivity. For example, certain data relating to financial or business transactions, to proprietary business information or technology, as part of Lawful Intercept activity or to national or government interests may be considered to be particularly sensitive, and it may be desirable to place restrictions on how such data may be transported. A security domain, SD, may be defined within an SDN for the transport and processing of sensitive data. A security domain is a network domain that groups virtual and physical entities or objects with different levels of sensitivity. Since SDN permits high flexibility and the possibility to change paths on the fly and also create network slices dynamically, it is desirable to be able to control that new paths and network slices meet security requirements for the transport of sensitive data. Respecting security requirements in the transport of sensitive data remains an ongoing challenge.

SUMMARY

It is an object to enable improved security of virtual links in a Software Defined Network.

A first aspect provides a method performed by an apparatus in a Software Defined Network, SDN. The method comprises receiving a request to define a virtual link, VL, in the SDN. The request includes security constraint information for the VL. The method further comprises identifying from a network topology of the SDN physical links that are Quantum Cryptography, QC, enabled. The method further comprises computing a path for the VL using only physical links of the identified QC enabled physical links. The method further comprises initiating provisioning of the VL using the computed path.

The method advantageously enables enforcement of security requirements for the transport of sensitive data over VLs in an SDN by ensuring that all physical links within a path for a VL are Quantum Cryptography, QC, enabled. The method advantageously enables control of physical link selection for VL paths according to whether links are QC enabled; the method enables enforcement of QC enabled links at the physical layer. SDN permits high flexibility and the ability to change paths on the fly and to create network slices dynamically. The method advantageously enables control of network slices, planned paths, protection paths and modification of paths, to ensure that the slices/paths are using QC enabled links and therefore can avoid eavesdropping from the links.

In an embodiment, said identifying comprises interrogating QKD support information of the network topology physical links in a Traffic Engineering Database, TED, of the SDN to identify the physical links that are QC enabled. The QKD support information is indicative of whether respective physical links are QC enabled. The method advantageously enables the TED to control physical link selection for VL paths according to whether links are QC enabled.

In an embodiment, the QKD support information is provided within link topology definitions of the physical links in the TED. The TED is therefore enriched with QKD support information, enabling a path for a VL to be computed using only QC enabled physical links.

In an embodiment, the QKD support information in the link topology definitions comprises one of a link type parameter indicative of whether the physical link is QC enabled or a link cost parameter indicative of whether the physical link is QC enabled. Providing a specific link type parameter that can indicate that a link is QC enabled may ensure that the link is always identified as a resource for a path for a VL that requires that all physical links are QC enabled. Providing a link cost parameter that can indicate that a link is QC enabled may ensure that the link is always identified as a resource for a path for a VL that requires that all physical links are QC enabled.

In an embodiment, the link cost parameter is set to a low value relative to the cost of non-QC enabled physical links of the network topology of the SDN. This may ensure that a QC enabled link is practically always selected as a resource for the path.

In an embodiment, a physical link is QC enabled if endpoint nodes of the physical link have access to a shared Quantum key, Qkey.

In an embodiment, the endpoint nodes are supported by a quantum key distribution, QKD, infrastructure across which the shared Qkey has been exchanged.

In an embodiment, the security constraint information comprises a VL descriptor, VLD, including a sensitivity level attribute value indicative of whether the VL requires a path that is QC enabled. The method provides a modified VLD that enables specification that the VL requires a path that is QC enabled.

In an embodiment, the sensitivity level attribute value is provided within a Connectivity Type information element of the VLD. The method may advantageously be implemented by modifying an existing information element of the VLD.

In an embodiment, the VL is for a security domain of the SDN.

In an embodiment, the VL is a lawful intercept, LI, interface. The method may be advantageously used for LI interfaces, such as H1/2/3 and X1/2/3 interfaces, and may enable improved security as compared to current H1/2/3 and X1/2/3 interfaces.

Corresponding embodiments and advantages apply to the apparatus, the computer program, the computer program product and the carrier containing a computer program described below.

A second aspect provides apparatus for a Software Defined Network, SDN. The apparatus comprises a controller and a Path Computation Element, PCE. The controller is configured to receive a request to define a virtual link, VL, in the SDN. The request includes security constraint information for the VL. The PCE is configured to identify from a network topology of the SDN physical links that are Quantum Cryptography, QC, enabled. The PCE is further configured to compute a path for the VL using only physical links of the identified QC enabled physical links. The controller is further configured to initiate provisioning of the VL using the computed path.

The PCE of the apparatus is advantageously enhanced to only use physical links that are QC enabled, to meet the security constraint information for the VL that the apparatus is defining. The same will hold for computation of protection paths and on the fly routing by the PCE. Any change in path computation due to the addition of new physical links shall only be possible if the new links are QC enabled.

In an embodiment, the apparatus further comprises a Traffic Engineering Database, TED, containing QKD support information of the network topology physical links. The PCE is configured to interrogate the QKD support information in the TED to identify physical links that are QC enabled. The QKD support information is indicative of whether respective physical links are QC enabled.

In an embodiment, the QKD support information is provided within link topology definitions of the physical links in the TED.

In an embodiment, the QKD support information in the link topology definitions comprises one of a link type parameter indicative of whether the physical link is QC enabled or a link cost parameter indicative of whether the physical link is QC enabled.

In an embodiment, a physical link is QC enabled if endpoint nodes of the physical link have access to a shared Quantum key, Qkey.

In an embodiment, the endpoint nodes are supported by a quantum key distribution, QKD, infrastructure across which the shared Qkey has been exchanged.

In an embodiment, the security constraint information comprises a VL descriptor, VLD, including a sensitivity level attribute value indicative of whether the VL requires a path that is QC enabled.

In an embodiment, the sensitivity level attribute value is provided within a Connectivity Type information element of the VLD.

In an embodiment, the apparatus comprises at least one processing circuitry and memory, the memory containing instructions executable by the at least one processing circuitry such that the apparatus is operative to implement the controller, the PCE and the TED as virtualised network functions, VNFs.

Corresponding embodiments and advantages apply to the apparatus for defining a VL in a SDN, described below.

A third aspect provides apparatus for defining a virtual link, VL, in a Software Defined Network, SDN. The apparatus comprises at least one processing circuitry and memory. The memory contains instructions executable by the at least one processing circuitry such that the apparatus is operative to: receive a request to define a virtual link, VL, in the SDN, the request including security constraint information for the VL; identify from a network topology of the SDN physical links that are Quantum Cryptography, QC, enabled; compute a path for the VL using only physical links of the identified QC enabled physical links; and initiate provisioning of the VL using the computed path.

A fourth aspect provides a computer program comprising instructions which, when executed on at least one processor, cause the at least one processor to carry out any of the above steps of the method performed by an apparatus in a Software Defined Network, SDN.

Embodiments of the invention will now be described, by way of example only, with reference to the accompanying drawings.

BRIEF DESCRIPTION OF THE DRAWINGS

FIGS. 4 and 5 are flowcharts illustrating embodiments of method steps.

DETAILED DESCRIPTION

Figure 1:
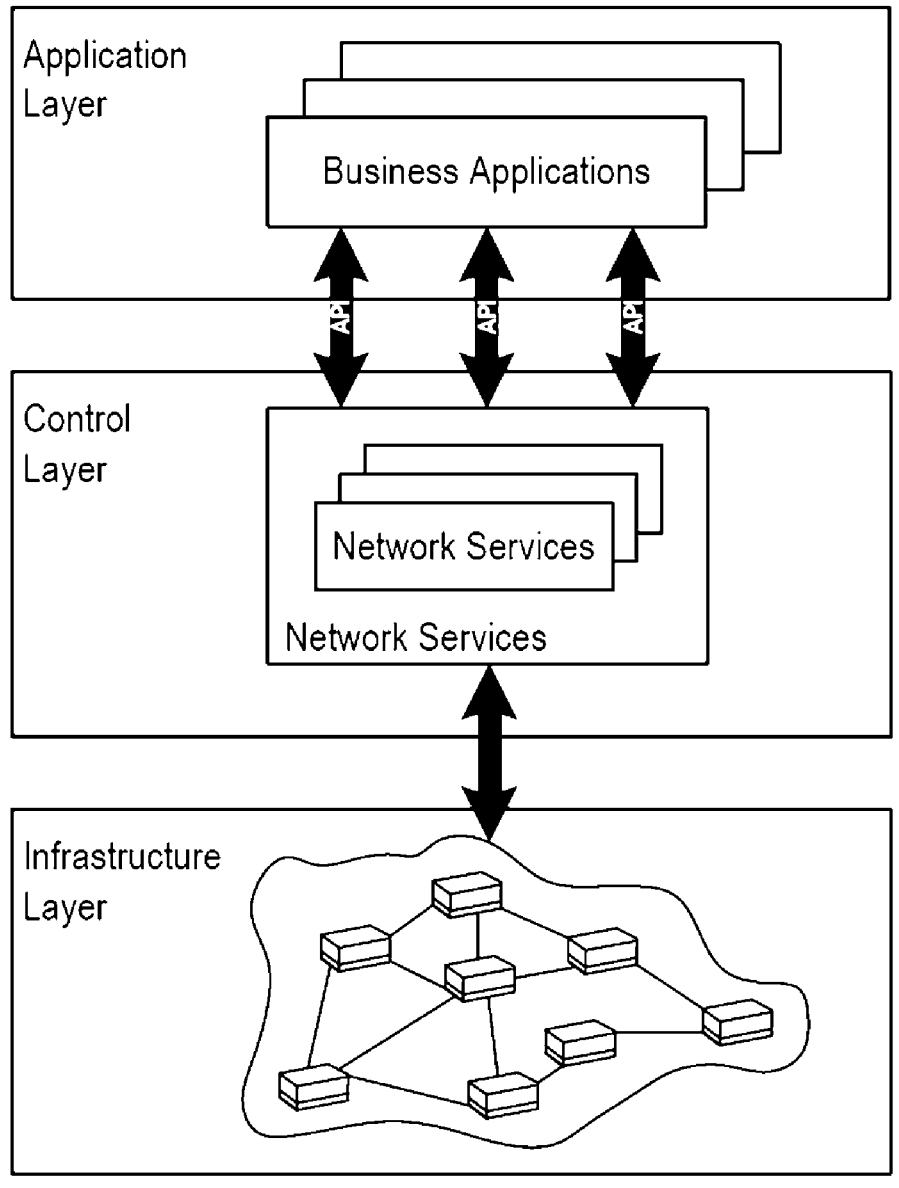
FIG. 1 illustrates an example prior art SDN architecture.
Figure 2:
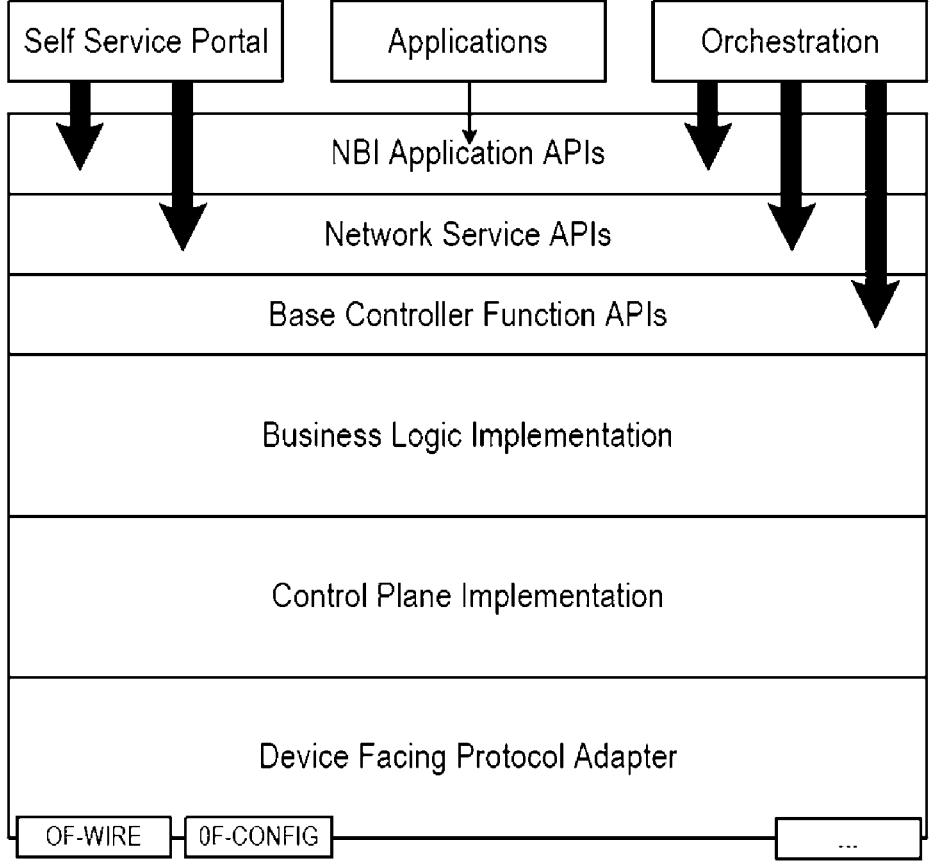
FIG. 2 illustrates prior art APIs for SDN.
Figure 3:
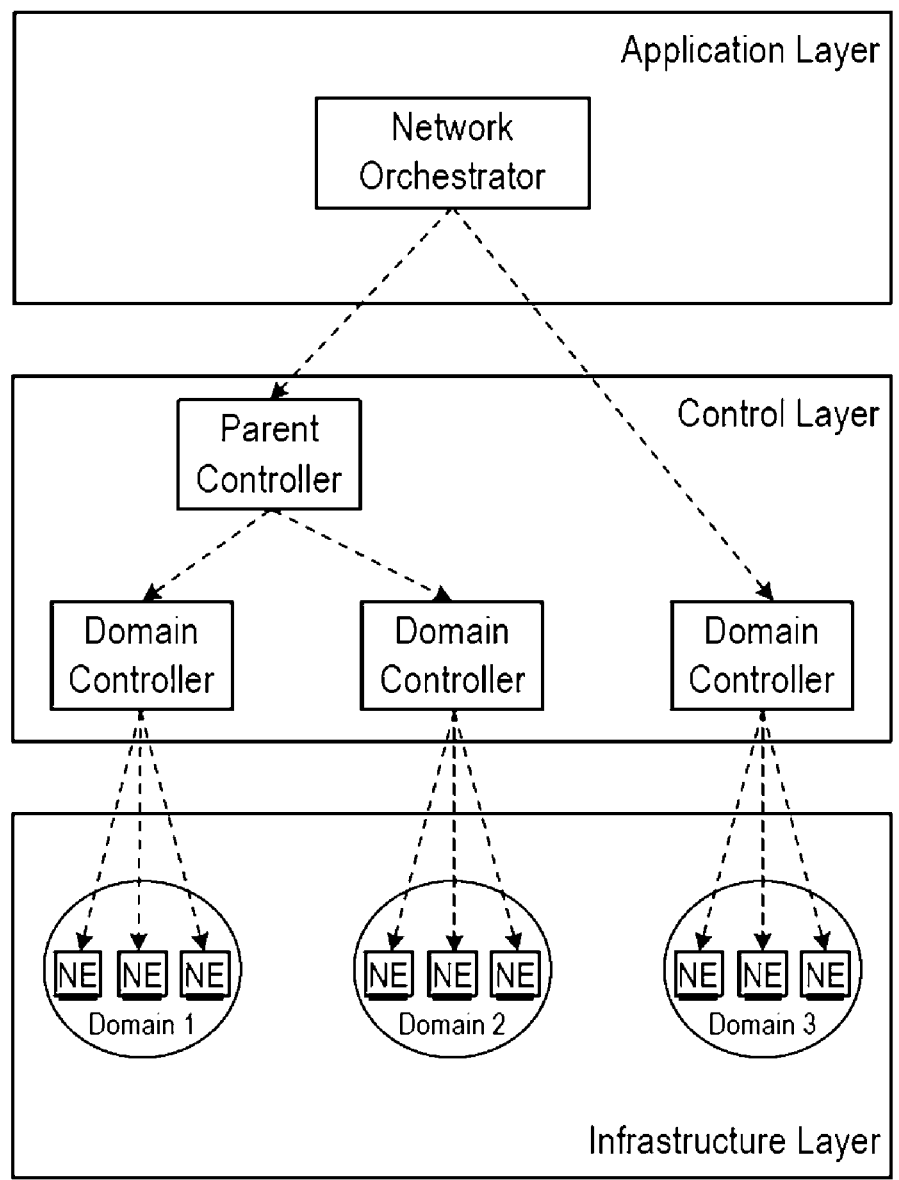
FIG. 3 illustrates another example prior art SDN architecture.

The same reference numbers will be used for corresponding features in different embodiments.

An embodiment provides a method 100 performed by an apparatus in a Software Defined Network, SDN. The steps of the method 100 are illustrated in FIG. 4 and comprise:

receiving 102 a request to define a virtual link, VL, in the SDN, the request including security constraint information for the VL;

identifying 104 from a network topology of the SDN physical links that are Quantum Cryptography, QC, enabled; and computing 106 a path for the VL using only physical links of the identified QC enabled physical links; and initiating 108 provisioning of the VL using the computed path.

Referring to FIG. 5, an embodiment provides a method 200 performed by an apparatus in a SDN. In this embodiment, the step of identifying physical links comprises interrogating 204 QKD support information of physical links of a network topology of the SDN to identify physical links that are QC enabled. The network topology and the QC support information are provided in a Traffic Engineering Database, TED, of the SDN. The QKD support information is indicative of whether respective physical links are QC enabled.

In an embodiment, the security constraint information comprises a VL descriptor, VLD. The VLD includes a sensitivity level attribute value indicative of whether the VL requires a path that is QC enabled. The sensitivity level attribute value may specify a sensitivity level of the VL, at least one value specifying a VL that requires all physical links in the path to be QC enabled.

In an embodiment, the sensitivity level attribute value is provided within a Connectivity Type information element of the VLD. The ConnectivityType information element defined at 6.5.3 of the ETSI GS NFV-IFA 014 V3.3.1 standard, "Network Functions Virtualisation (NFV) Release 3; Management and Orchestration; Network Service Templates Specification" may be modified in this respect to include an additional Attribute "sensitivityLevel", as illustrated in Table 6.5.3.2-1A below:

In an embodiment, the QKD support information is provided within link topology definitions of the physical links in the TED.

In an embodiment, the QKD support information in the link topology definitions is a link type parameter indicative of whether the physical link is QC enabled. The link type parameter can be set for a link to indicate that the link is QC enabled. This may ensure that the link is always identified as a QC enabled candidate link for a path for a VL having security constraint information indicating that the VL requires a path that is QC enabled.

In another embodiment, the QKD support information in the link topology definitions is a link cost parameter indicative of whether the physical link is QC enabled. The link cost parameter can be set for a link to indicate that the link is QC enabled by giving the link a cost that is lower than non-QC enabled physical links of the network topology of the SDN. This may cause the link to practically always be identified as a QC enabled candidate link for a path for a VL having security constraint information indicating that the VL requires a path that is QC enabled.

In an embodiment, a physical link is QC enabled if endpoint nodes of the physical link have access to a shared Quantum key, Qkey.

In an embodiment, the endpoint nodes are supported by a quantum key distribution, QKD, infrastructure across which the shared Qkey has been exchanged.

In an embodiment, the VL is for a security domain of the SDN.

Figure 8:
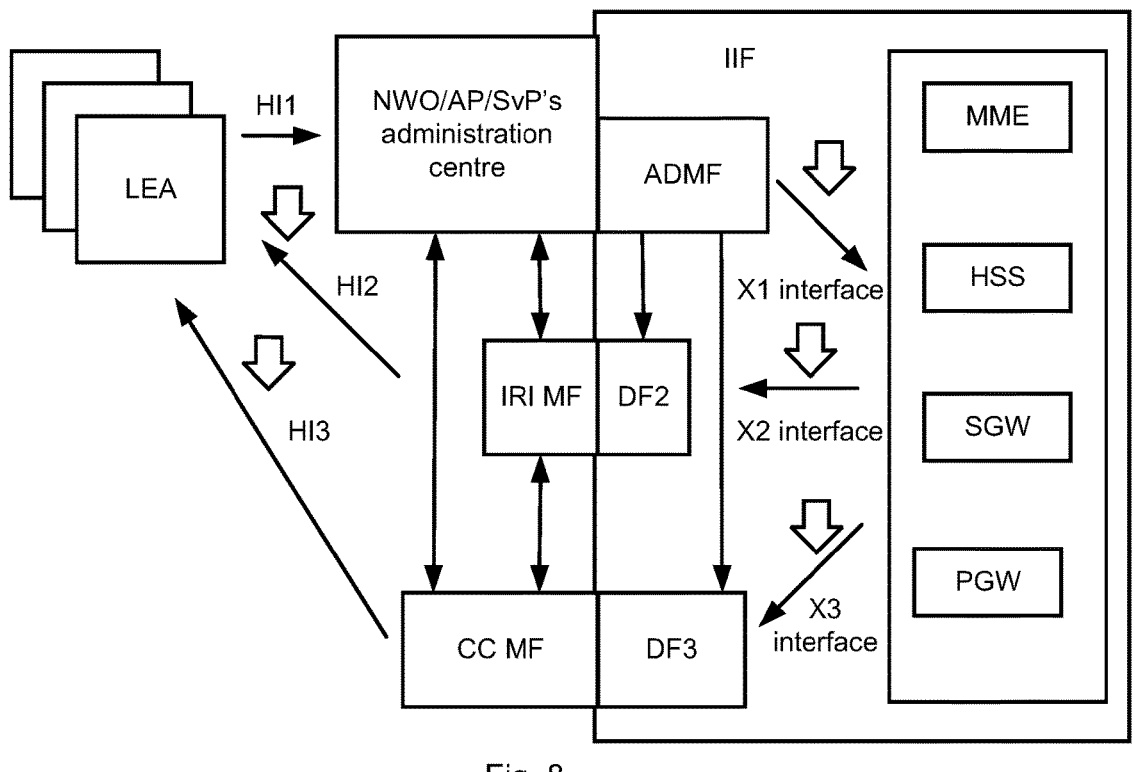
FIG. 8 illustrates a prior art 4G lawful intercept system.
Figure 9:
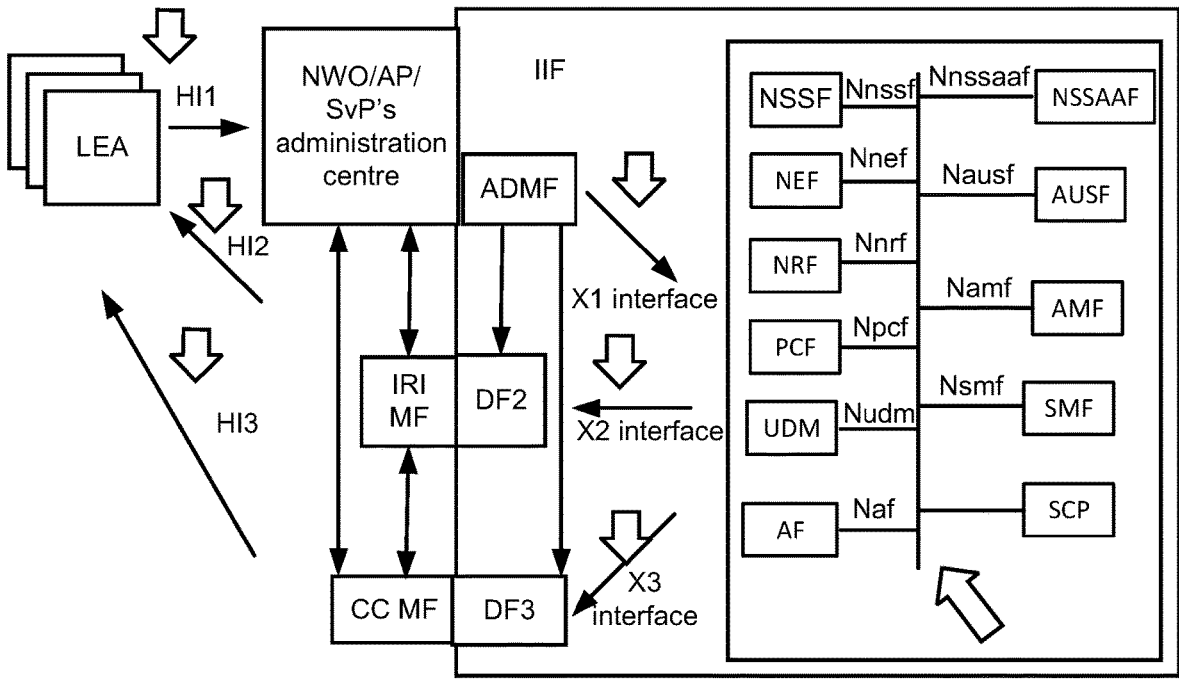
FIG. 9 illustrates a prior art 5G lawful intercept system.

In an embodiment, the VL is a lawful intercept, LI, interface according to the ETSI TS 133 107 v16.0.0 (3GPP TS 33.107 version 16.0.0 Release 16) standard on "Lawful interception architecture and functions". The VL may, for example be a H1/2/3 interface or an X1/2/3 interface, as illustrated in FIG. 9. The method 100 is applicable whether the Administration Function, ADMF, and/or the Intercepting Control Elements, ICE, such as the 4G Mobility Management Entity, MME, Home Subscriber Server, HSS, Serving Gateway, SGW, and Packet Data Network Gateway, PGW, as illustrated in FIG. 8, or 5G Access and Mobility Management Functions, AMF, Session Management Function, SMF, Unified Data Management, UDM, User Plane Function, UPF, and Policy Control Function, PCF, as illustrated in FIG. 9, are deployed as physical network functions or virtualized network functions, according to the ETSI NFV standard definitions.

TABLE 6.5.3.2-1A

| Attributes of the Connectivity Type information element | | | | |
|---|---|---|---|---|
| Attribute | Qualifier | Cardinality | Content | Description |
| layerProtocol | M | 1 . . . N | Enum | Specifies the protocols the VL uses (Ethernet, MPLS, ODU2, IPV4, IPV6, Pseudo-Wire). See note. |
| flowPattern | M | 0 . . . 1 | String | Specifies the flow pattern of the connectivity (Line, Tree, Mesh, etc.). |
| sensitivityLevel | M | 0 . . . 1 | String | Specifies the sensitivity level of the connection which implies that Quantum Cryptography enabled path shall be available between the end-points of the link. |

NOTE:
The top layer protocol of the VL protocol stack shall always be provided. The lower layer protocols may be included when there are specific requirements on these layers.

Figure 6:
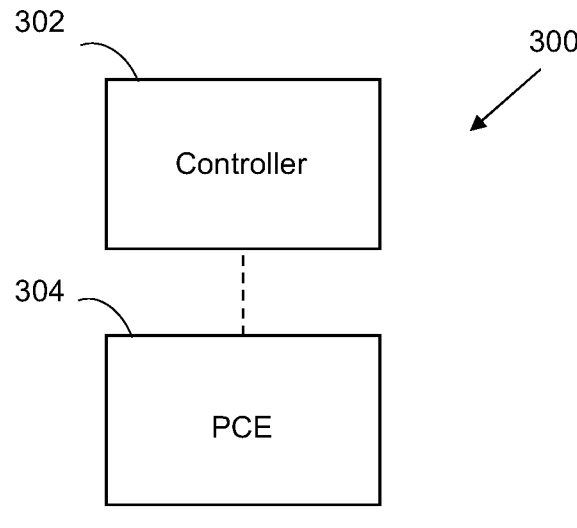
FIGS. 6 and 7 are block diagrams illustrating embodiments of apparatus.

An embodiment provides apparatus 300 for a Software Defined Network, SDN, as illustrated in FIG. 6. The apparatus comprises a controller 302 and a Path Computation Element, PCE, 304.

The controller 302 is configured to receive a request to define VL in the SDN. The request includes security constraint information for the VL.

The PCE 304 is configured to identify from a network topology of the SDN physical links that are QC enabled and to compute a path for the VL using only physical links of the identified QC enabled physical links. The controller is further configured to initiate provisioning of the VL using the computed path.

Figure 7:
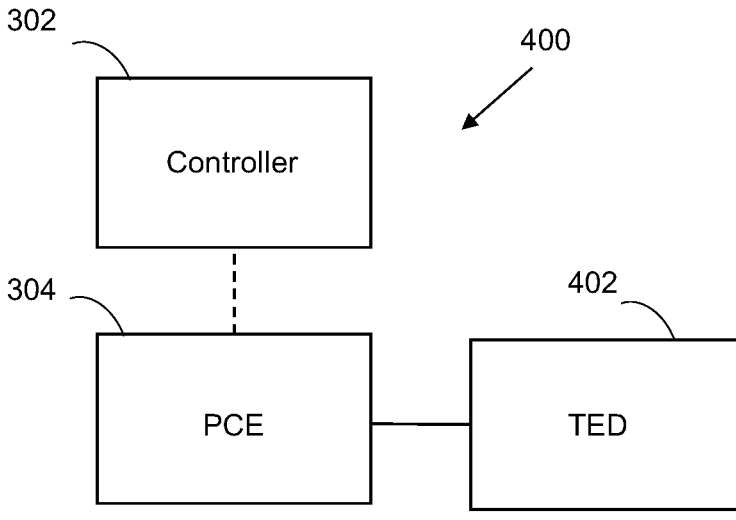

In an embodiment, as illustrated in FIG. 7, the apparatus 400 further comprises a Traffic Engineering Database, TED 402. The TED contains QKD support information of the network topology physical links. The QKD support information is indicative of whether respective physical links are QC enabled. The PCE 304 is configured to interrogate the QKD support information in the TED to identify physical links that are QC enabled.

In an embodiment, the controller 302 is an SDN controller. In an SDN controller, traffic engineering, TE, information is exchanged, and based on exchanged TE information, the TED is built. A TED is generated based on network domain resources and network topology information. It includes the topology of the controlled network Nodes and Links and the connectivity and bandwidth of the Nodes/Links. It also stores available resources and attributes, such as available link bandwidth, link metrics (e.g. costs), delay and jitters.

The SDN controller 302 requests the PCE 304 to compute a path for the VL. A PCE typically calculates all paths based on source/database node information and network performance elements (such as bandwidth, delay, etc.) received from a TED. The information received from the TED is used by the PCE to compute an optimal path meeting specified requirements, including the requirement that the path only uses physical links of the identified QC enabled physical links.

In an alternative embodiment, the controller is an orchestrator or a network management system, NMS.

In an embodiment, the QKD support information is provided within link topology definitions of the physical links in the TED.

In an embodiment, the QKD support information in the link topology definitions is a link type parameter indicative of whether the physical link is QC enabled. The link type parameter can be set for a link to indicate that the link is QC enabled. This may ensure that the link is always identified as a QC enabled candidate link for a path for a VL having security constraint information indicating that the VL requires a path that is QC enabled.

In another embodiment, the QKD support information in the link topology definitions is a link cost parameter indicative of whether the physical link is QC enabled. The link cost parameter can be set for a link to indicate that the link is QC enabled by giving the link a cost that is lower than non-QC enabled physical links of the network topology of the SDN. This may cause the link to practically always be identified as a QC enabled candidate link for a path for a VL having security constraint information indicating that the VL requires a path that is QC enabled.

In an embodiment, a physical link is QC enabled if endpoint nodes of the physical link have access to a shared Quantum key, Qkey.

In an embodiment, the endpoint nodes are supported by a quantum key distribution, QKD, infrastructure across which the shared Qkey has been exchanged.

In an embodiment, the security constraint information comprises a VL descriptor, VLD. The VLD includes a sensitivity level attribute value indicative of whether the VL requires a path that is QC enabled. The sensitivity level attribute value may specify a sensitivity level of the VL, at least one value specifying a VL that requires all physical links in the path to be QC enabled.

In an embodiment, the sensitivity level attribute value is provided within a Connectivity Type information element of the VLD. The ConnectivityType information element defined at 6.5.3 of the ETSI GS NFV-IFA 014 V3.3.1 standard, "Network Functions Virtualisation (NFV) Release 3; Management and Orchestration; Network Service Templates Specification" may be modified in this respect to include an additional Attribute "sensitivityLevel", as illustrated in Table 6.5.3.2-1A above.

In an embodiment, the VL is for a security domain of the SDN.

In an embodiment, the VL is a lawful intercept, LI, interface according to the ETSI TS 133 107 v16.0.0 (3GPP TS 33.107 version 16.0.0 Release 16) standard on "Lawful interception architecture and functions". The VL may, for example be a H1/2/3 interface or an X1/2/3 interface, as illustrated in FIG. 9. The method 100 is applicable whether the Administration Function, ADMF, and/or the Intercepting Control Elements, ICE, such as 4G MME, HSS, SGW and PGW, as illustrated in FIG. 8, or 5G AMF, SMF, UDM, UPF, PCF, as illustrated in FIG. 9, are deployed as physical network functions or virtualized network functions, according to the ETSI NFV standard definitions.

Figure 10:
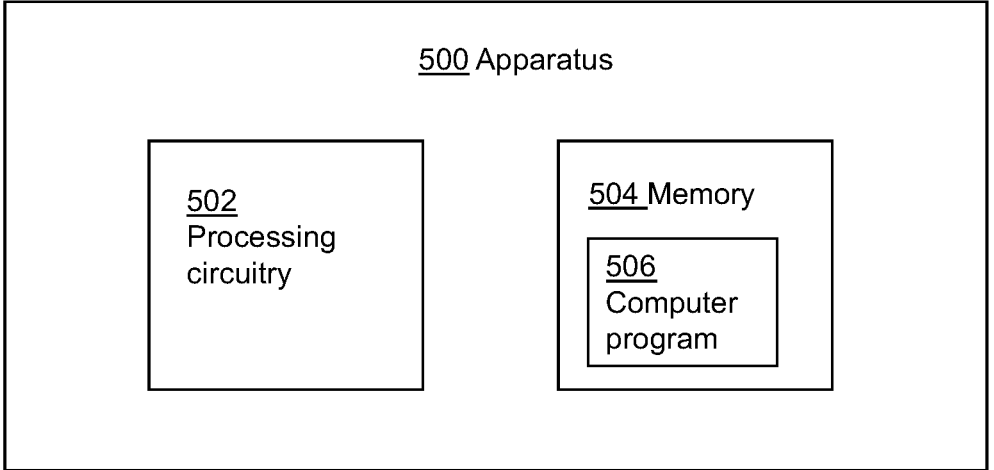
FIG. 10 is a block diagram illustrating an embodiments of an apparatus.

In an embodiment, the apparatus 500 comprises at least one processing circuitry 502 and memory 504, as illustrated in FIG. 10. The memory contains instructions executable by the at least one processing circuitry such that the apparatus is operative to implement the controller, the PCE and the TED as virtualised network functions, VNFs.

The method 100 and apparatus 300, 400 described above are relevant to the following use cases:

VL provisioning

VL planned path and link protection

VL path modification due to modifications on the availability of links within the network where alternative paths are calculated dynamically. This can be due to operation state changes, but also to modifications in the network due to new nodes/links being available.

The main operations impacted within the above use cases are:

Link instantiation—this shall be possible according to a selection of attributes based on whether the link is QC enabled.

New type of links shall be added to the TED with the indication that they are QC enabled (this can be declared optional in the implementation). This shall be solved including the QKD support information when selecting input from the TED by the PCE.

Corresponding embodiments apply to the apparatus 500 for defining a virtual link, VL, in a Software Defined Network, SDN, detailed below.

Referring to FIG. 10, an embodiment provides apparatus 500 for defining a virtual link, VL, in a Software Defined Network, SDN. The apparatus comprising at least one processing circuitry 502 and memory 504.

The memory contains instructions executable by the at least one processing circuitry such that the apparatus is operative to:

receive a request to define VL in the SDN, the request including security constraint information for the VL;

identify from a network topology of the SDN physical links that are Quantum Cryptography, QC, enabled;

compute a path for the VL using only physical links of the identified QC enabled physical links; and initiate provisioning of the VL using the computed path.

An embodiment provides a computer program comprising instructions which, when executed on at least one processor, cause the at least one processor to carry out any of the above steps of the method 100 performed by an apparatus in a Software Defined Network, SDN.

The invention claimed is:

1. A method performed by an apparatus in a Software Defined Network, SDN, the method comprising: receiving a request to define a virtual link, VL, in the SDN, the request including security constraint information for the VL; identifying from a network topology of the SDN physical links that are Quantum Cryptography, QC, enabled; wherein a physical link is QC enabled if endpoint nodes of the physical link have access to a shared Quantum key, Qkey; computing a path for the VL using only physical links of the identified QC enabled physical links; and initiating provisioning of the VL using the computed pathi wherein said identifying comprises interrogating QKD0 support information of the network topology physical links in a Traffic Engineering Database, TED, of the SDN to identify the physical links that are QC enabled, the QKD support information indicative of whether respective physical links are QC enabled; and wherein the QKD support information is provided within link topology definitions of the physical links in the TED.

2. The method as claimed in claim 1, wherein the QKD support information in the link topology definitions comprises one of a link type parameter indicative of whether the physical link is QC enabled or a link cost parameter indicative of whether the physical link is QC enabled.

3. The method as claimed in claim 1, wherein the endpoint nodes are supported by a quantum key distribution, QKD, infrastructure across which the shared Qkey has been exchanged.

4. The method as claimed in claim 1, wherein the security constraint information comprises a VL descriptor, VLD, including a sensitivity level attribute value indicative of whether the VL requires a path that is QC enabled.

5. The method as claimed in claim 4, wherein the sensitivity level attribute value is provided within a Connectivity Type information element of the VLD.

6. The method as claimed in claim 1, wherein the VL is for a security domain of the SDN.

7. The method as claimed in claim 1, wherein the VL is a lawful intercept, LI, interface.

8. Apparatus for a Software Defined Network, SDN, the apparatus comprising: a controller configured to: receive a request to define a virtual link, VL, in the SDN, the request including security constraint information for the VL; and a Path Computation Element, PCE, (304) configured to: identify from a network topology of the SDN physical links that are Quantum Cryptography, QC, enabled; wherein a physical link is QC enabled if endpoint nodes of the physical link have access to a shared Quantum key, Qkey; and compute a path for the VL using only physical links of the identified QC enabled physical links, wherein the controller is further configured to initiate provisioning of the VL using the computed path a Traffic Engineering Database, TED, containing QKD support information of the network topology physical links and wherein the PCE is configured to interrogate the QKD support information in the TED to identify physical links that are OC enabled, the QKD support information indicative of whether respective physical links are QC enabled; wherein the QKD support information is provided within link topology definitions of the physical links in the TED.

9. Apparatus as claimed in claim 8, wherein the QKD support information in the link topology definitions comprises one of a link type parameter indicative of whether the physical link is QC enabled or a link cost parameter indicative of whether the physical link is QC enabled.

10. Apparatus as claimed in claim 8, wherein a physical link is QC enabled if endpoint nodes of the physical link have access to a shared Quantum key, Qkey.

11. Apparatus as claimed in claim 8, wherein the security constraint information comprises a VL descriptor, VLD, including a sensitivity level attribute value indicative of whether the VL requires a path that is QC enabled.

12. Apparatus as claimed in claim 11, wherein the sensitivity level attribute value is provided within a Connectivity Type information element of the VLD.

13. Apparatus as claimed in claim 8, wherein the apparatus comprises at least one processing circuitry and memory, the memory containing instructions executable by the at least one processing circuitry such that the apparatus is operative to implement the controller, the PCE and the TED as virtualised network functions, VNFs.

14. A non-transitory computer-readable medium comprising instructions which, when executed on at least one processor, cause the at least one processor to carry out a method according to claim 1.

15. Apparatus for defining a virtual link, VL, in a Software Defined Network, SDN, the apparatus comprising at least one processing circuitry and memory, the memory containing instructions executable by the at least one processing circuitry such that the apparatus is operative to: receive a request to define a virtual link, VL, in the SDN, the request including security constraint information for the VL; identify from a network topology of the SDN physical links that are Quantum Cryptography, QC, enabled; wherein a physical link is QC enabled if endpoint nodes of the physical link have access to a shared Quantum key, Qkey; compute a path for the VL using only physical links of the identified QC enabled physical links; and initiate provisioning of the VL using the computed path wherein said identifying comprises interrogating QKD support information of the network topology physical links in a Traffic Engineering Database, TED, of the SDN to identify the physical links that are QC enabled, the QKD support information indicative of whether respective physical links are OC enabled; and wherein the QKD support information is provided within link topology definitions of the physical links in the TED.

* * * * *